(No Model.)
H. BARBER.
SPRING DRAFT ATTACHMENT FOR VEHICLES.
No. 549,592. Patented Nov. 12, 1895.
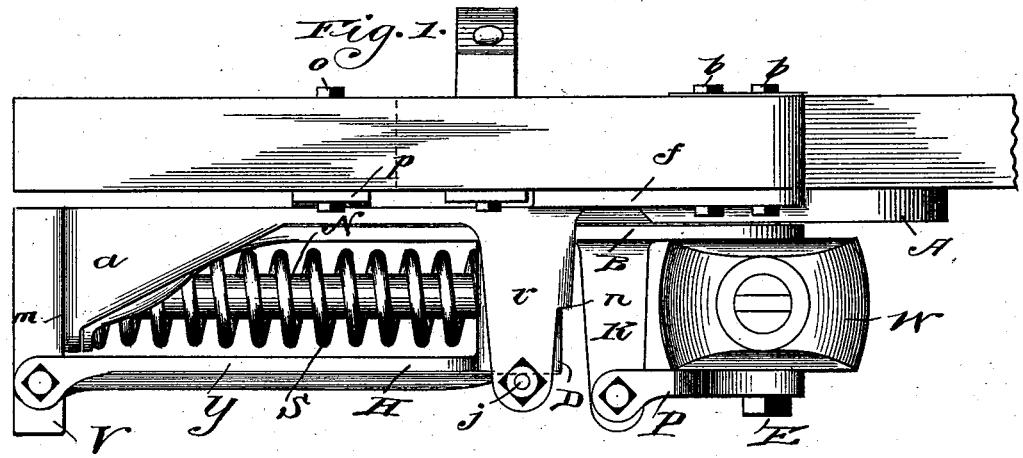
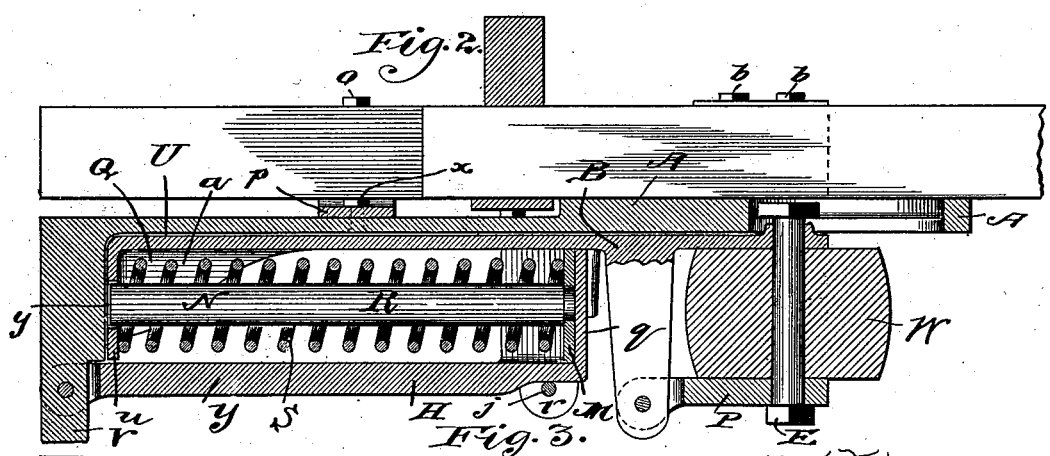
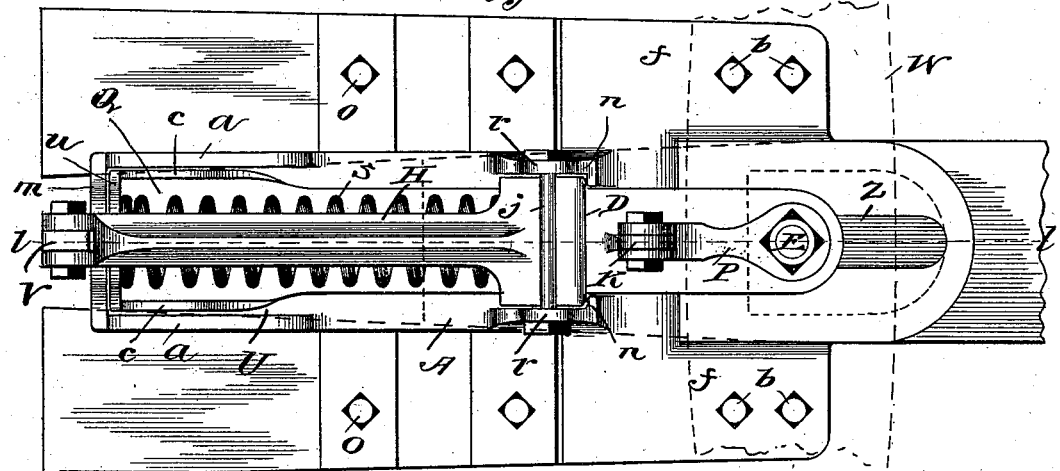
Witnesses,
S. S. Mann
S. W. Brainard
Inventor,
Hiram Barber

UNITED STATES PATENT OFFICE.

HIRAM BARBER, OF CHICAGO, ILLINOIS.

SPRING DRAFT ATTACHMENT FOR VEHICLES.

SPECIFICATION forming part of Letters Patent No. 549,592, dated November 12, 1895.

Application filed March 6, 1893. Serial No. 464,655. (No model.)

*To all whom it may concern:*

Be it known that I, HIRAM BARBER, a citizen of the United States, residing at Chicago, in the county of Cook and State of Illinois, have invented certain new and useful Improvements in Spring Draft Attachments for Vehicles, of which the following is a specification.

My invention relates to the class of spring draft attachments to be applied to wagons, plows, harrows, or other vehicles or implements of industry; and it consists in certain details of construction and arrangement of parts hereinafter more particularly described in the specification, illustrated in the drawings, and pointed out in the claims.

Of the drawings herewith submitted, Figure 1 is a side elevation of my spring draft attachment when in position for use. Fig. 2 is a longitudinal vertical section through the center, and Fig. 3 an inverted plan view showing my device attached on the under side of the hounds of the tongue of a vehicle.

The object of my spring draft attachment is to secure a yielding connection between the vehicle and the draft-animal. That a yielding connection when properly arranged affords the draft-animal the greatest relief is a fact now generally recognized. The shock or concussion upon the shoulder of the draft-animal in passing over rough roads or uneven surfaces is thereby reduced to the minimum.

The great difficulty in spring draft attachments in which a coil-spring is used heretofore encountered has been to secure a satisfactory degree of durability, efficiency in operation, and simplicity in construction. In devices of this character heretofore in use the coil-spring has usually been compressed within a tubular casing by means of a rod or bar passing through the coil of the spring. This arrangement has been found to be cumbersome and difficult to attach to the wagon or vehicle. The draw-bar is also usually fastened by means of a nut or burr at the rear end thereof. With slight use this nut or burr is liable to become loosened. A further difficulty is also found in connecting the evener with the device.

In my spring draft attachment herein described, I have aimed to overcome these difficulties and at the same time to secure the three essentials—viz., durability, efficiency in operation, and simplicity in construction.

In the construction of my spring draft attachment as herein described I make use of the plate A, the draw-bar B, the holder H, the core R, the coil-spring S, hammer-strap P, the evener W, the evener-bolt E, and the necessary bolts to secure the same firmly to the wagon or vehicle.

In Fig. 1 the plate A is shown as attached to the under side of the hounds or fixed part of the wagon or vehicle by means of the bolts $b\ b$, passing through the flanges $f f$, and also by means of the cross-plate $p$, which is attached to the hounds by means of the bolts $o\ o$, and also to the plate A by means of the bolt $x$. The rear end of the plate A is provided with the recess or chamber U, situated upon the lower surface thereof. This chamber is formed by the brackets $a\ a$ and rear wall $m$, which are made integral with the plate A and with each other at the points or line of junction thereof. The plate A is also provided with the arms $r\ r$, extending outward at right angles with the lower surface of the plate A and made integral therewith at the line of attachment or junction. The arms $r\ r$ are placed on the outer edge of the lower surface of the plate A, with the inner faces thereof parallel with each other. The forward border of the arms $r\ r$ are also turned inward at the base thereof, thus forming the shoulders $n\ n$. The forward end of the plate A is also provided with the lateral flanges $f f$ and the longitudinal slot Z. Around the slot Z the edges of the upper surface of the plate A are countersunk, so as to form a channel of sufficient width and depth to receive the head of the evener-bolt E and to permit the free forward and backward movement of the stem of the bolt E in the slot Z. The rear wall of the chamber U is also provided with the lug V. The draw-bar B is provided with the chamber Q on the rear end thereof, formed by the brackets $c\ c$ and the rear wall $u$. The brackets $c\ c$ and the wall $u$ are made integral with the shaft of the draw-bar B and with each other at the line of junction. The draw-bar B is also provided with the arm K. The rear wall $u$ of the chamber Q is perforated, so as to permit the passage of the stem N of the core R. The chamber Q of the draw-bar B is designed to receive and hold the rear end of the coil-spring S and of the stem of the core R.

The holder H is provided with the stem Y and the hood D. The hood D is designed to receive and hold the head M of the core R, and also the forward end of the coil-spring S. When in position, the rear end of the stem Y of the holder H is pivoted to the lug V, while the hood D is securely held in place between the arms *r r* by means of the bolt *j* and shoulder *n n*. The core R is designed to prevent the coil-spring S from buckling and is provided with the head M, which serves to keep the coil-spring S from contact with the draw-bar B or with the stem Y of the hood D.

The hammer-strap P is attached to the arm K of the draw-bar B.

It will be observed that in my spring draft attachment herein described the coil-spring S is compressed by the forward movement of the draw-bar B, by which the rear wall *u* of the chamber Q is forced against the rear end of the coil-spring S, the forward end of which is held firmly in the hood D. The lower margin of the front wall *q* of the hood D is so adjusted as to leave room for the free movement of the draw-bar B between the hood D and the plate A. The rear end of the core R is fitted to pass through the opening *y* in the rear wall *u* of the chamber Q, and thus permits the free forward and backward movement of the draw-bar B. When, therefore, forward pressure is exerted upon the evener W, the draw-bar B readily moves forward to the extent of the compression of the coil-spring S, and thus a yielding connection between the draft-animal and the vehicle is obtained.

Having thus explained the object, purpose, method of construction, and mode of operation of my spring draft attachment, what I claim as novel, and for which I seek Letters Patent, is—

1. In a spring draft attachment for vehicles the combination with the tongue, hounds, or other fixed part thereof, of a rigid plate provided at its rear end with a chamber and at its forward end with a longitudinal slot for the evener bolt; a draw-bar designed to move longitudinally upon the fixed plate, provided at its rear end with a chamber within the chamber of the fixed plate, and at an intermediate point near its forward end with a perforated standard to serve as a pivot for the hammer strap; a holder, one end of which is pivotally connected with a projection from the vertical end-wall of the fixed plate, and its opposite end turned upward and inward to serve as a hood or recess to receive the end of a spiral spring; a spiral spring confined between the holder and draw-bar; a core having its forward end seated in the forward end-wall of the hood of the holder, projecting rearwardly through the spiral spring and through an opening in the end-wall of the chamber in the draw-bar, to the vertical wall of the fixed plate, and means for attaching the draft to the draw-bar in front of the confined spring, substantially as set forth.

2. In a spring draft attachment for vehicles, the combination with the tongue or other fixed part thereof, of a plate rigidly fixed thereto, having at its rear end a vertical wall or bracket, and near its front end a longitudinal slot; a draw-bar adapted to move longitudinally on the fixed plate and provided at its rear end with a chamber having its end wall perforated; a holder consisting of a rearwardly longitudinally extending member, pivotally connected at its rear end with a vertical projection of the fixed plate, and provided at its front end with a hood or chamber secured to the fixed plate; a spiral spring between the holder and draw-bar having its forward end abutting against the wall of the hood of the holder, and its rear end against the wall of the chamber on the rear end of the movable draw plate; and an evener secured to the draw plate, substantially as and for the purpose set forth.

3. In a spring draft attachment, the combination with the tongue or other fixed part of a vehicle, of the rigidly fixed plate A having a chamber at its rear end; the longitudinal movable draw-bar B provided at its rear end with the chamber Q and at an intermediate point with the vertical arm K; the holder H pivotally united at its rear end to the projection V of the vertical end wall Y of the fixed plate, and having at its front end the hood D; the spiral spring S, confined between the holder and the draw-bar; the core R extending through the spiral spring and through a perforation in the wall of the chamber Q of the draw-bar and having its ends fixed in the wall of the hood D in front, and the wall Y of the chamber Q of the fixed plate; the hammer strap P pivotally united to the arm K of the draw-bar; and the evener movably secured by a bolt extending through the hammer-strap, the evener, and a longitudinal slot in the fixed plate A, substantially as set forth.

4. In a spring draft attachment for vehicles, the chambered, longitudinally-slotted fixed plate A; the holder H having one end pivotally hinged to an extension of the wall of the fixed plate A and its opposite hooded end confined thereto by the integral side arms *r* and the bolt *j;* the core R having its head or forward end fixed in, or against the wall of the hood D of the holder, and its rear end in the vertical end wall of the fixed plate; the draw-bar having the chamber Q provided with a slot or opening in its end wall to permit the passage of the core R, and movably located on the fixed plate between the core and holder with its forward end projecting through a recess in the wall of the hood D; the spring S surrounding the core and the evener attached to the forward projecting end of the draw-bar, all arranged and combined substantially as set forth.

Dated February 27, A. D. 1893.

HIRAM BARBER.

Witnesses:
J. W. WATERMAN,
J. F. CARMICHAEL.